United States Patent
Lin et al.

(10) Patent No.: US 9,205,588 B2
(45) Date of Patent: Dec. 8, 2015

(54) TEMPERATURE MEASUREMENT COMPONENT EMBEDDED HOT RUNNER NOZZLE STRUCTURE

(71) Applicant: WISTRON CORP., New Taipei (TW)

(72) Inventors: Yuan-Shiang Lin, New Taipei (TW); An-Chen Hung, New Taipei (TW); Li-Chih Chen, New Taipei (TW); Chien-Yu Ko, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 14/082,157

(22) Filed: Nov. 17, 2013

(65) Prior Publication Data

US 2014/0377395 A1    Dec. 25, 2014

(30) Foreign Application Priority Data

Jun. 24, 2013  (TW) .............. 102122328 A

(51) Int. Cl.
*B29C 45/72* (2006.01)
*B29C 45/78* (2006.01)
*B29C 45/27* (2006.01)

(52) U.S. Cl.
CPC ............. *B29C 45/78* (2013.01); *B29C 45/2737* (2013.01); *B29C 2045/274* (2013.01); *B29C 2045/2741* (2013.01); *B29C 2945/7604* (2013.01); *B29C 2945/76277* (2013.01); *B29C 2945/76287* (2013.01)

(58) Field of Classification Search
CPC ...... B29C 45/72; B29C 47/82; B29C 47/627; B29C 47/625; B29C 47/0009; B29C 47/66; B29C 47/92; B29C 47/825; B29C 45/78; B29C 2045/2741; B29C 45/2737; B29C 2045/274; B29C 2945/76287; B29C 2945/76277; B29C 2945/7604
See application file for complete search history.

(56) References Cited

U.S. PATENT DOCUMENTS

| | | | | |
|---|---|---|---|---|
| 2,727,277 | A | * | 12/1955 | Blumer ................... 432/219 |
| 2,919,469 | A | * | 1/1960 | Wheeler ................. 425/207 |
| 3,218,671 | A | * | 11/1965 | Justus et al. .......... 425/144 |
| 3,369,594 | A | * | 2/1968 | Farrell ................... 165/263 |
| 3,743,252 | A | * | 7/1973 | Schott, Jr. ............. 366/145 |
| 3,866,669 | A | * | 2/1975 | Gardiner ............... 165/254 |
| 4,155,690 | A | * | 5/1979 | Checkland et al. ...... 425/113 |
| 4,480,981 | A | * | 11/1984 | Togawa et al. ......... 425/143 |

(Continued)

FOREIGN PATENT DOCUMENTS

| | | | | |
|---|---|---|---|---|
| JP | 58108120 | * | 6/1983 | ........ B29F 3/08 |
| TW | 488487 | | 5/2002 | |

OTHER PUBLICATIONS

Taiwan Patent Office, Office action issued on Jul. 21, 2015.

*Primary Examiner* — Yogendra Gupta
*Assistant Examiner* — Emmanuel S Luk
(74) *Attorney, Agent, or Firm* — Li & Cai Intellectual Property (USA) Office

(57) ABSTRACT

A hot runner nozzle structure includes a tubular nozzle and at least one temperature measurement component. The tubular nozzle has an outer wall surface and an inner wall surface defining a flow channel. The tubular nozzle has portions defining at least one thru-hole interconnected the outer wall surface and the inner wall surface. The temperature measurement component has a base and a sensor connected to the base. The base is fixed in the thru-hole. The sensor has a tip protruding beyond the inner wall surface and exposed in the flow channel.

18 Claims, 4 Drawing Sheets

(56) References Cited

U.S. PATENT DOCUMENTS

| | | | | |
|---|---|---|---|---|
| 4,634,361 | A * | 1/1987 | Piazzola | 425/190 |
| 4,880,162 | A * | 11/1989 | Howells et al. | 239/406 |
| 5,334,008 | A * | 8/1994 | Gellert | 425/549 |
| 6,755,564 | B2 * | 6/2004 | Eiva | 366/145 |
| 6,852,257 | B2 * | 2/2005 | Eiva | 264/40.6 |
| 2004/0089074 | A1 * | 5/2004 | Avisse | 73/726 |
| 2005/0073067 | A1 * | 4/2005 | Noriega Escobar et al. | 264/40.1 |
| 2008/0203596 | A1 * | 8/2008 | Okada | 264/40.6 |
| 2009/0096120 | A1 * | 4/2009 | Subramonian et al. | 264/40.1 |
| 2012/0294331 | A1 * | 11/2012 | Mogari et al. | 374/144 |

* cited by examiner

TEMPERATURE MEASUREMENT COMPONENT EMBEDDED HOT RUNNER NOZZLE STRUCTURE

BACKGROUND OF THE DISCLOSURE

1. Field of the Disclosure

The instant disclosure relates to a temperature measurement component embedded hot runner nozzle structure; in particular, to a hot runner nozzle structure for transferring molten plastics from the injection nozzle to the mold cavity through the hot runners and related plastic mold injection structures.

2. Description of Related Art

Runners or flow channels mainly serves to transfer molten plastics which are emitted from the nozzle to the mold cavity. The quality of the flow channels directly affects the overall plastic properties, product appearance, precision of dimensions, and molding cycle. Since designers often delegate the quality portion of the work to the molding factory, quality control becomes difficult to manage.

Typical runners are generally categorized as hot and cold runners. A hot runner provides a channel for plastic materials to enter from the injection molding machine to the mold gate. After the plastic product has been ejected for each injection, the plastic materials remaining in the flow channel, which are not solidified, are not bound to be purged. Specifically, hot runner is suitable for manufacturing thin components and large scale plastic components such as liner board for vehicles, and housing for large size LCD televisions. Hot runner is known best for its small flow resistance and small pressure lost, which facilitates molding.

The main difference between hot runner and cold runner is the injection molding process. In general, temperature control is appropriately applied such that plastics in the flow channels or runners remain in a molten state, different from the molten plastics in the mold cavity which will eventually solidify, which prevent the casting system from cold slugging. As a result, no excess materials are generated. Since the plastics in the flow channel are not solidified, the injection flow in the flow channel remains smooth for the next injection. In order to keep a smooth flow, temperature control for the hot runner requires highly sensitive. Conventional runners are equipped with automatic heat adjustment controls as well as insulating means to prevent heat loss, clogging in the hot runner nozzle, and to ensure the flow properties of the plastics.

In terms of temperature control of hot runners in conventional arts, temperature measurements for the temperature of the molten plastics inside the hot runner are generally acknowledged as the temperature of the hot runner's main body at thermal equilibrium. Then, temperature is controlled accordingly, which is considered as an indirect temperature measurement. However, the aforementioned method does not reflect the actual temperature changes of the molten plastics within runners, nor provides information regarding the thermal stability among various regions. Consequently, the temperature displayed on temperature control varies from the actual temperature of the injection molten plastics, rendering the situation where the control temperature displaying normal temperature, yet the injection plastics are insufficiently heated or overheat (thermal cracking or pyrolysis). As a result, delays occur due to machine adjustments and time is consumed to track the root cause of the molding anomalies.

To address the above issues, the inventor strives via associated experience and research to present the instant disclosure, which can effectively improve the limitation described above.

SUMMARY OF THE DISCLOSURE

The object of the instant disclosure is to provide a hot runner flow channel which can directly measure the internal temperature of the molten materials, and thus, accurately determine instant temperature changes for more preferred hot runner temperature control.

In order to achieve the aforementioned objects, according to an embodiment of the instant disclosure, a temperature measurement component embedded hot runner nozzle structure is provided, which includes a tubular nozzle and at least one temperature measurement component. The tubular nozzle has an outer wall surface and an inner wall surface. The inner wall surface defines a flow channel therein. The tubular nozzle has portions defining at least one thru-hole, and the thru-hole is interconnected the outer wall surface to the inner wall surface. The measuring device has a base and a sensor connected to the base. The base is fixed in the thru-hole. The sensor has a tip protruding from the inner wall surface and exposed to the flow channel. The sensor provides a direct measurement of molten materials in the hot runner nozzle structure.

The instant disclosure can precisely measure the instant temperature changes of the molten materials in order to provide more preferred temperature control and further enhance product quality.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

Figure 1:
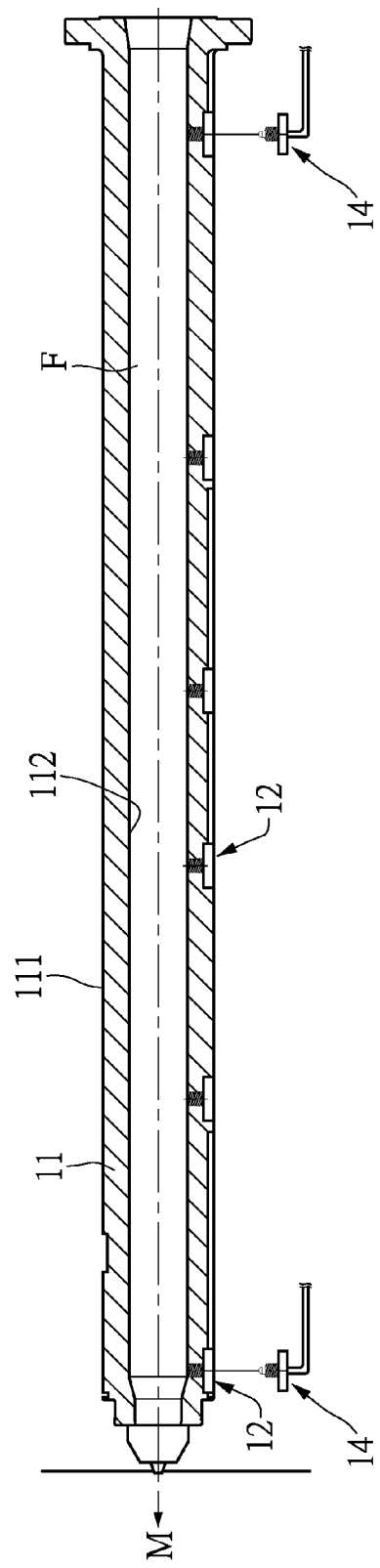
FIG. 1 is a cross-sectional view of a temperature measurement component embedded hot runner nozzle structure in accordance with the instant disclosure.

Please refer to FIG. 1 as a cross-sectional view of the temperature measurement component embedded hot runner nozzle structure in accordance with the instant disclosure. The embodiments of the instant disclosure use hot runners of the plastic mold injection technology as an example for the purpose of explanation, but are not limited herein. The instant disclosure may apply to situations when a temperature measurement is needed of liquid or gas flow channel. The instant embodiment takes into consideration of a complex design since molten materials (such as molten plastics not shown in figures) flow in internal flow channels F of the hot runners in a relatively fast rate.

The instant disclosure provides a temperature measurement component embedded hot runner nozzle structure, which will be simplified as the hot runner structure throughout the instant disclosure. The hot runner structure includes a tubular nozzle 11 connected to a mold M, and at least one temperature measurement component 14. The number of temperature measurement component 14 depends on the number of temperature measuring points. The temperature measurement component 14 is directly extended into a flow channel F of the tubular nozzle 11 in order to make direct contact with the molten materials and provide relatively more accurate temperature measurements. The instant embodiment specifically ensures normal operations of the hot runners in harsh environments.

Figure 2:
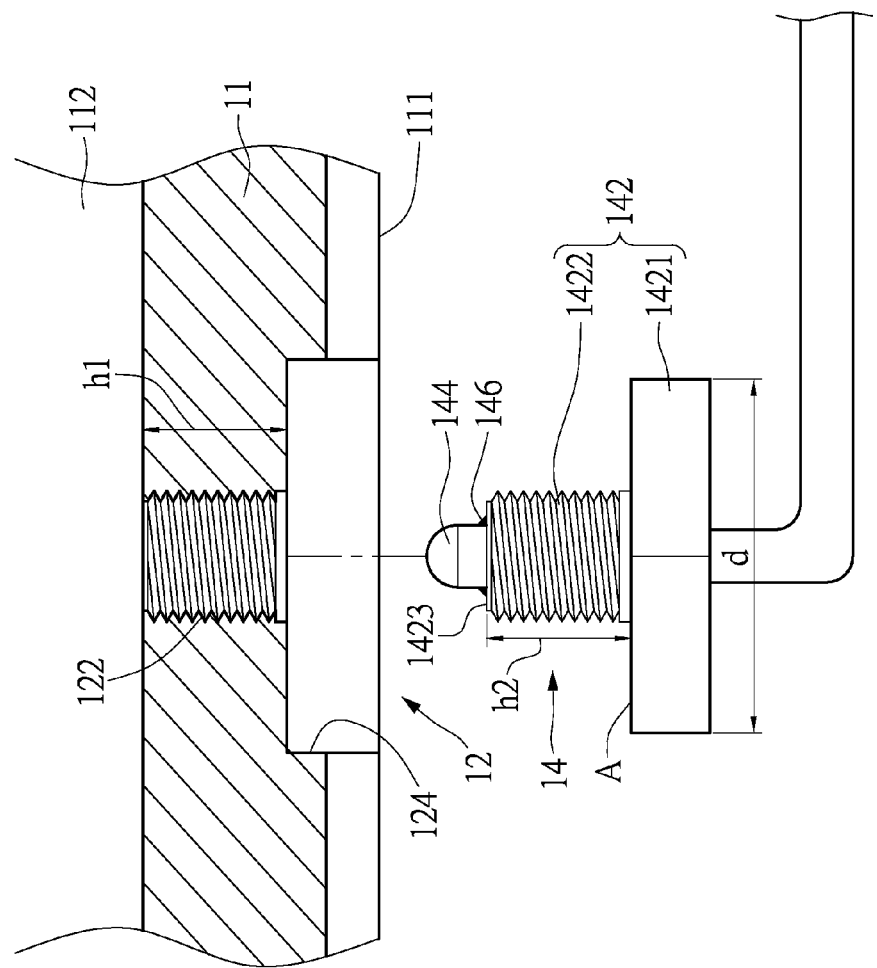
FIG. 2 is a cross-sectional view detailing a temperature measurement component and a tubular nozzle of the temperature measurement component embedded hot runner nozzle structure in accordance with the instant disclosure.

Please refer to FIG. 2 as the detail view illustrating a portion of the instant disclosure in FIG. 1. The tubular nozzle 11 has an outer wall surface 111 and an inner wall surface 112. The inner wall surface 112 defines the flow channel F therein. The tubular nozzle 11 has portions defining a plurality of thru-holes 12 interconnecting the outer wall surface 111 to the inner wall surface 112. The number of thru-hole 12 corresponds to the number of the temperature measurement component 14. The thru-holes 12 of the instant disclosure are spaced apart by substantially the same distance from one to another and are evenly arranged on the tubular nozzle 11 according to a length of the tubular nozzle 11 such as near a front end, a mid-segment, or a rear end of the flow channel F.

The body of the tubular nozzle 11 is typically made by steel lathing. The thru-holes 12 of the instant embodiment can be formed by first drilling, and then further tapping an inner sidewall of the thru-hole 12 to form a tapped thread 122 on the inner sidewall. In order to increase the degree of fitting between the temperature measurement components 14 and the thru-holes 12 of the instant embodiment, which is to prevent molten materials from leaking therebetween, a counterbore 124 is formed on each thru-hole 12 after tapping. The tubular nozzle 11 can be heat treated thereafter to increase hardness. The tubular nozzle 11 can undergo surface refinement thereafter according to needs.

Temperature measurement component 14 has a base 142 and a sensor 144 connected to the base 142. The base 142 is fitted in the thru-hole 12. The sensor 144 has a tip which protrudes from the inner wall surface and exposes to the flow channel F to be in direct contact with the molten materials and provide direct temperature measurements. The base 142 of temperature measurement component 14 has a screw head 1421 and a screw thread 1422 corresponding to the tapped thread 122. The screw head 1421 is arranged on an end of the base 142 distal from the sensor 144 and is connected to the screw thread 1422. The screw head 142 has a head surface A (as shown in FIG. 2), which is engaged to a bottom surface of the tubular nozzle defining the counterbore 124, such that the base 14 and the tubular nozzle 11 has sufficient surface area of contact to provide preferred sealing and prevent molten materials from leaking. The screw head 1421 in the instant embodiment is a screw with hexagonal-shaped head (ex. socket screw), which is used with a hex tool for locking, but is limited therein. The surface area of the head surface A of the socket screw (screw head 1421) is larger than 50 square millimeters in an embodiment of the instant disclosure. In addition, the diameter d of the screw head 1421 can be smaller the diameter of the counterbore 124 to facilitate securing the screw with the hex tool.

The manufacturing process of the temperature measurement component 14 includes planing the lower half portion of the screw head 1421 and lathing the upper half portion, outer diameters, and bores. Threads are lathed to form the screw thread 1422. The sensor 144 then can be inserted through the thru-hole 12 such that the tip of the base 142 protrudes about 0.5 mm. The sensor 144 of the instant disclosure is a thermocouple, specifically, a contact thermocouple, which applies the Seebeck effect to measure temperature. The effect basically converts temperature potential into electrical potential by relying on the different responses, induced by a temperature difference, from two different metals connected in two points of a closed loop in order to create a current in the loop. The thermocouple may of various types such as B, R, S, K, E, J and T, each having unique characteristics and a temperature range. For example, the instant embodiment uses the K type for measuring the preferred temperature range, −200° C. to 1200° C. Other types may also be appropriate such as the J type whose temperature ranges from −40° C. to +750° C., or the N type which has high stability, resistant to oxidation at high temperature, and a temperature range of 1200° C. and above.

In order to enhance the connection between the sensor 144 and the base 142, the intersected portions of the sensor 144 and the base 142 are and welded or brazed with filler materials 146 therebetween. Generally, brazing is a process in which heat is added to filler materials, whose melting point is below that of the workpiece, to above its melting point. As a result, the filler materials have sufficient fluidity to fill in between the two workpieces, also known as infiltration, via capillary action and solidify the connection between the two workpieces. After the welded surface has been cleaned up, mechanized torch welding via heated gas flame, can be used near the weld joints for connection. Brazing can firmly connected to the sensor 144 and the base 142.

Figure 3:
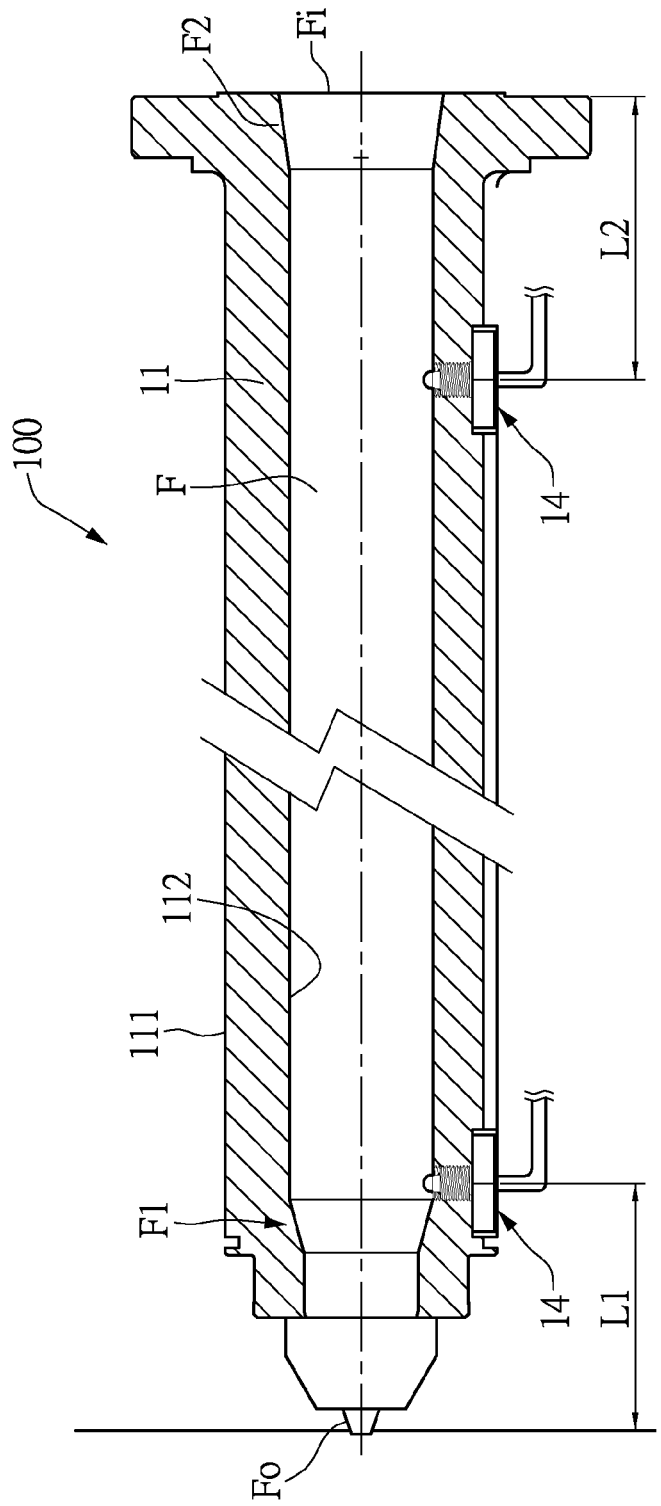
FIG. 3 is a segmented cross-sectional view of the temperature measurement component embedded hot runner nozzle structure in accordance with the instant disclosure.

Please refer to FIG. 3 as a cross-sectional view of the assembled hot runner nozzle structure 100 (partial cross-sectional view) in accordance with the instant disclosure. The temperature measurement component 14 of the instant disclosure can be configured at least one diameter-changed portion of the inner wall surface 112 having a diameter change F1, F2 (hereinafter know as diameter-changed portion) of the flow channel F. The temperatures of flowing materials illustrate rather significant changes at portions having a diameter change F1, F2. Portions of the tubular nozzle 11 (flow channel F) proximate to the inlet $F_i$ and the outlet $F_o$ generally have the diameter-changed portions F1, F2. One temperature measurement component 14 is configured between the outlet $F_o$ and the diameter-changed portion F2 proximate to the inlet $F_i$. Another temperature measurement component 14 is configured between the inlet $F_i$ and the diameter-changed portion F1 proximate to the outlet $F_o$. The temperature measurement component 14 and the diameter-changed portions (F1 or F2) are spaced apart by a distance of less than 40 millimeters. The temperature measurement component 14 and the diameter-changed portion F2 proximate to the inlet $F_i$ are spaced apart by a distance of substantially 40 millimeters in the instant embodiment. Also, the temperature measurement component 14 and the diameter-changed portion F1 proximate to the outlet $F_o$ are spaced apart by a distance of less than 40 millimeters. The temperature measurement component 14 is generally arranged on flat portions of the inner wall surface 112 proximate to the gradually tapering portions.

Figure 4:
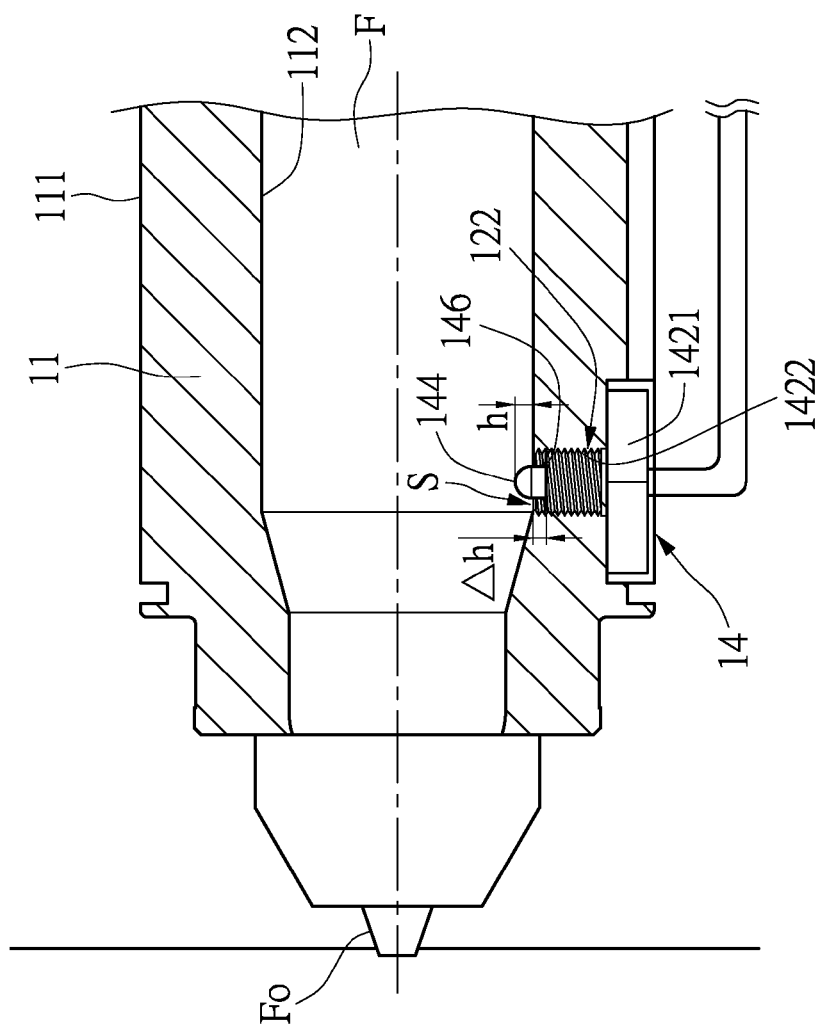
FIG. 4 is another cross-sectional view detailing the temperature measurement component and the tubular nozzle of the temperature measurement component embedded hot runner nozzle structure in accordance with the instant disclosure.

Please refer to FIG. 4. In order to prevent plastics from leaking, which is due to the instant pressure of injected materials, through a gap between the screw thread 1422 and the sensor 144 after the temperature measurement component 14 is securely fixed in the thru-holes 11 of the tubular nozzle 11, the tip of the sensor 144 protrudes from the inner wall surface 112 of the tubular nozzle 11 by a height h of less than or equal to 2 millimeters (mm). More preferably, the height h is less than 0.5 mm to prevent the temperature measurement component 14 structure from damages or shear failure caused by the repetitive flowing molten plastics in the hot runner. A part of the sensor 144 is received in the thru-hole 12. As shown in FIG. 4, a height h1 of the tapped thread 122 along the direction of the thru-hole 12 is larger than a height h2 of the screw thread 1421 of the base 142 along the direction of the thru-hole 12, so that an end surface 1423 of the screw thread 1421 connected to the sensor 144 is lower than an inner wall surface 112 of the flow channel F. A height difference Δh is formed between the end surface 1423 and inner wall surface 112. Therefore, a recess space S is defined by the end surface 1423 of the screw thread 1421 and the tapped thread 122, which is surrounding the sensor 144. The filler material 146 is brazed between the sensor 144 and the base 142 on the end surface 1423 of the screw thread 1421, and the filler material 146 is arranged inside the recess space S.

In the temperature measurement component embedded hot runner nozzle structure of the instant disclosure, once the temperature measurement component 14 is fixed onto the tubular nozzle 11, external heaters can be installed and fixed onto the tubular nozzle to prevent short circuit due to contact with the signal wires of the temperature measurement component 14.

The hot runner structure of the instant disclosure is first placed in a condition where the structure is heated to and maintained at a preferred temperature such that the temperature of the structure is stabilized. Once the mold is assembled, direct temperature measurements during molding can be taken directly from the molten materials in the tubular nozzle 11 and be compared with the preferred set temperature of the external heater (not shown in figures). As a result, the temperature of the heat caused by the shear stress generated between the high flow rate molten materials and the tubular nozzle 11 can be compared against to determine if it is lower than the pyrolysis temperature of the molten materials. In turn, product quality can be controlled and molding defects can be minimized due to unstable temperature control of the hot runner system.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. A temperature measurement component embedded hot runner nozzle structure, comprising:
    a tubular nozzle having an outer wall surface and an inner wall surface, the inner wall surface defining a flow channel therein, the tubular nozzle having at least one thru-hole interconnected the outer wall surface to the inner wall surface, wherein an inner sidewall of the tubular nozzle defining the thru-hole is formed with a tapped thread thereon, wherein the thru-hole is formed with a counterbore; and
    at least one temperature measurement component having a base and a sensor connected to the base, the base fixed in the thru-hole, the sensor having a tip protruding from the inner wall surface and exposed to the flow channel;
    wherein a part of the sensor is received in the thru-hole;
    wherein the base has a screw thread corresponding to the tapped thread, and a screw head arranged at an end thereon distal from the sensor and connects to the screw thread, and the screw head has a head surface engaged to a planar bottom surface of the counterbore, so as to provide a sufficient surface area of contact between the base and the tubular nozzle to seal and prevent molten materials from leaking; wherein a part of the screw head is received in the counterbore, and a part of the screw head is protruded from the outer wall surface of the tubular nozzle;
    wherein a height of the tapped thread along the direction of the thru-hole is larger than a height of the screw thread of the base along the direction of the thru-hole, so that an end surface of the screw thread connected to the sensor is lower than an inner surface of the flow channel, thereby a recess space is defined by the end surface of the screw thread and the tapped thread surrounding the sensor;
    wherein a filler material is brazed between the sensor and the base on the end surface of the screw thread, and the filler material is arranged inside the recess space;
    wherein the sensor directly measures temperatures of molten materials in the hot runner nozzle structure.

2. The Temperature measurement component embedded tubular nozzle structure as recited in claim 1, wherein the bottom surface of the counterbore has a surface area larger than 50 square millimeters.

3. The Temperature measurement component embedded tubular nozzle structure as recited in claim 1, wherein the tip of the sensor protrudes from the inner wall surface by a distance of less than 0.5 millimeters.

4. The Temperature measurement component embedded tubular nozzle structure as recited in claim 3, wherein the tubular nozzle has at least one diameter-changed portion of the inner wall surface having a diameter change, and the temperature measurement component is configured proximate to the at least one diameter-changed portion of the inner wall surface.

5. The Temperature measurement component embedded tubular nozzle structure as recited in claim 4, wherein the tubular nozzle further has an inlet and an outlet, one of the at least one diameter-changed portion of the inner wall surface is arranged proximate to the inlet, the temperature measurement component is configured between the outlet and the one of the at least one diameter-changed portion of the inner wall surface.

6. The Temperature measurement component embedded tubular nozzle structure as recited in claim 5, wherein a distance between the temperature measurement component and the one of the at least one diameter-changed portion of the inner wall surface proximate to the inlet is less than 40 millimeters.

7. The Temperature measurement component embedded tubular nozzle structure as recited in claim 4, wherein the tubular nozzle further has an inlet and an outlet, one of the at least one diameter-changed portion of the inner wall surface is arranged proximate to the outlet, and the temperature measurement component is configured between the inlet and the one of the at least one diameter-changed portion of the inner wall surface.

8. The Temperature measurement component embedded tubular nozzle structure as recited in claim 7, wherein a distance between the temperature measurement component and the one of the at least one diameter-changed portion of the inner wall surface is less than 40 millimeters.

9. The Temperature measurement component embedded tubular nozzle structure as recited in claim 4, wherein the sensor is a thermocouple.

10. The Temperature measurement component embedded tubular nozzle structure as recited in claim 9, wherein the thermocouple is a thermocouple selected from the group consisting of a K-shaped, a J-shaped, and an N-shaped thermocouple.

11. The Temperature measurement component embedded tubular nozzle structure as recited in claim 1, wherein the tip of the sensor protrudes from the inner wall surface by a distance of less than 0.5 millimeters.

12. The Temperature measurement component embedded tubular nozzle structure as recited in claim 1, wherein the tubular nozzle has at least one diameter-changed portion of the inner wall surface having a diameter change, and the temperature measurement component is configured proximate to the at least one diameter-changed portion of the inner wall surface.

13. The Temperature measurement component embedded tubular nozzle structure as recited in claim 12, wherein the tubular nozzle further has an inlet and an outlet, one of the at least one diameter-changed portion of the inner wall surface is arranged proximate to the inlet, the temperature measurement component is configured between the outlet and the one of the at least one diameter-changed portion of the inner wall surface.

14. The Temperature measurement component embedded tubular nozzle structure as recited in claim 13, wherein a distance between the temperature measurement component and the one of the at least one diameter-changed portion of the inner wall surface proximate to the inlet is less than 40 millimeters.

15. The Temperature measurement component embedded tubular nozzle structure as recited in claim 12, wherein the tubular nozzle further has an inlet and an outlet, one of the at least one diameter-changed portion of the inner wall surface is arranged proximate to the outlet, and the temperature measurement component is configured between the inlet and the one of the at least one diameter-changed portion of the inner wall surface.

16. The Temperature measurement component embedded tubular nozzle structure as recited in claim 15, wherein a distance between the temperature measurement component and the one of the at least one diameter-changed portion of the inner wall surface proximate to the outlet is less than 40 millimeters.

17. The Temperature measurement component embedded tubular nozzle structure as recited in claim 1, wherein the sensor is a thermocouple.

18. The Temperature measurement component embedded tubular nozzle structure as recited in claim 17, wherein the thermocouple is a thermocouple selected from the group consisting of a K-shaped, a J-shaped, and an N-shaped thermocouple.

* * * * *